(12) United States Patent
Miao et al.

(10) Patent No.: US 8,456,825 B2
(45) Date of Patent: Jun. 4, 2013

(54) CONNECTION STRUCTURE AND ELECTRONIC DEVICE USING THE SAME

(75) Inventors: Yi-Chieh Miao, Taoyuan (TW); Chih-Ying Huang, Taoyuan (TW)

(73) Assignee: FIH (Hong Kong) Limited, Kowloon (HK)

( * ) Notice: Subject to any disclaimer, the term of this patent is extended or adjusted under 35 U.S.C. 154(b) by 184 days.

(21) Appl. No.: 13/036,111

(22) Filed: Feb. 28, 2011

(65) Prior Publication Data

US 2012/0120566 A1 May 17, 2012

(30) Foreign Application Priority Data

Nov. 15, 2010 (TW) .............................. 99139213 A

(51) Int. Cl.
*H05K 5/00* (2006.01)
*A47B 81/00* (2006.01)
*E05C 19/16* (2006.01)
*H04M 1/00* (2006.01)

(52) U.S. Cl.
USPC .............. 361/679.27; 361/679.55; 312/223.2; 292/251.5; 455/575.1; 455/347

(58) Field of Classification Search
USPC ........... 455/575; 361/679.01, 679.26, 679.27, 361/679.58; 174/50
See application file for complete search history.

(56) References Cited

U.S. PATENT DOCUMENTS

| | | | |
|---|---|---|---|
| 6,517,129 B1* | 2/2003 | Chien et al. ................. | 292/251.5 |
| 7,261,331 B2* | 8/2007 | Lin ............................... | 292/116 |
| 2005/0168923 A1* | 8/2005 | Huang et al. .................. | 361/683 |
| 2006/0056140 A1* | 3/2006 | Lev ............................... | 361/683 |

* cited by examiner

*Primary Examiner* — Zachary M Pape
*Assistant Examiner* — Douglas Burtner
(74) *Attorney, Agent, or Firm* — Altis Law Group, Inc.

(57) ABSTRACT

An electronic device includes a first base member, a second base member detachably connected to the first base member and a connection structure. The connection structure includes an assembling latch and a magnetic piece. The assembling latch is located in the first base member. The magnetic piece is located in the second base member and provides a driving force. The magnetic piece attracts the assembling latch, the assembling latch partially moves out the first base member and is partially received in the second base member to connect and assemble the first base member and the second base member side by side. When the first base member and the second base member are detached, the assembling latch moves back to and is received in the first base member.

11 Claims, 5 Drawing Sheets

CONNECTION STRUCTURE AND ELECTRONIC DEVICE USING THE SAME

BACKGROUND

1. Technical Field

The disclosure generally relates to connection structures and electronic devices, and more particularly to a connection structure and a detachable electronic device using the connection structure.

2. Description of the Related Art

Detachable electronic devices, such as mobile phones, personal digital assistants (PDAs), are now in widespread use. Each detachable electronic device may be detached into two separate operation components (e.g., display component and keyboard), the separate operation components can work independently and communicate with each other through wireless signals.

However, the separate operation components of a typical electronic device are normally connected together by complicated hooks and locking mechanisms, which may be difficult to assemble and detach the separate operation components.

Therefore, there is room for improvement within the art.

BRIEF DESCRIPTION OF THE DRAWINGS

Many aspects of an exemplary connection structure and electronic device using the same can be better understood with reference to the following drawings. The components in the drawings are not necessarily drawn to scale, the emphasis instead being placed upon clearly illustrating the principles of the exemplary connection structure and electronic device using the same. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
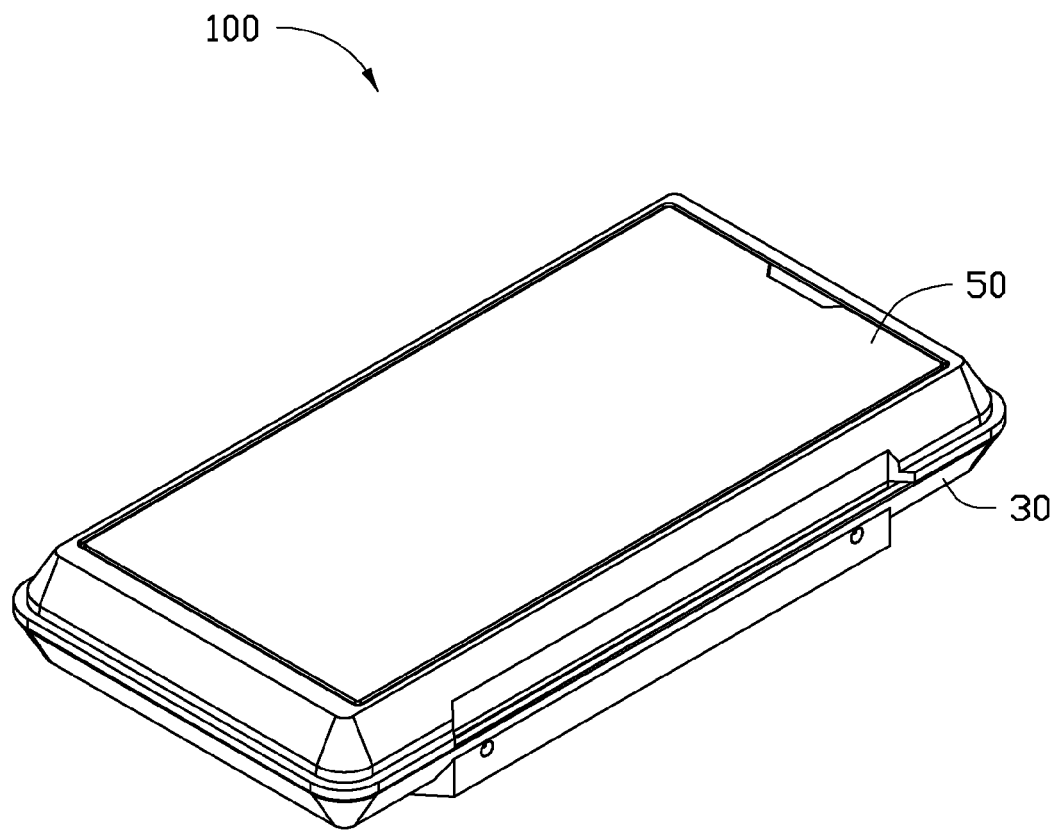
FIG. 1 is an assembled view of an electronic device including a first base member, connection structures, and a second base member, according to an exemplary embodiment.
Figure 4:
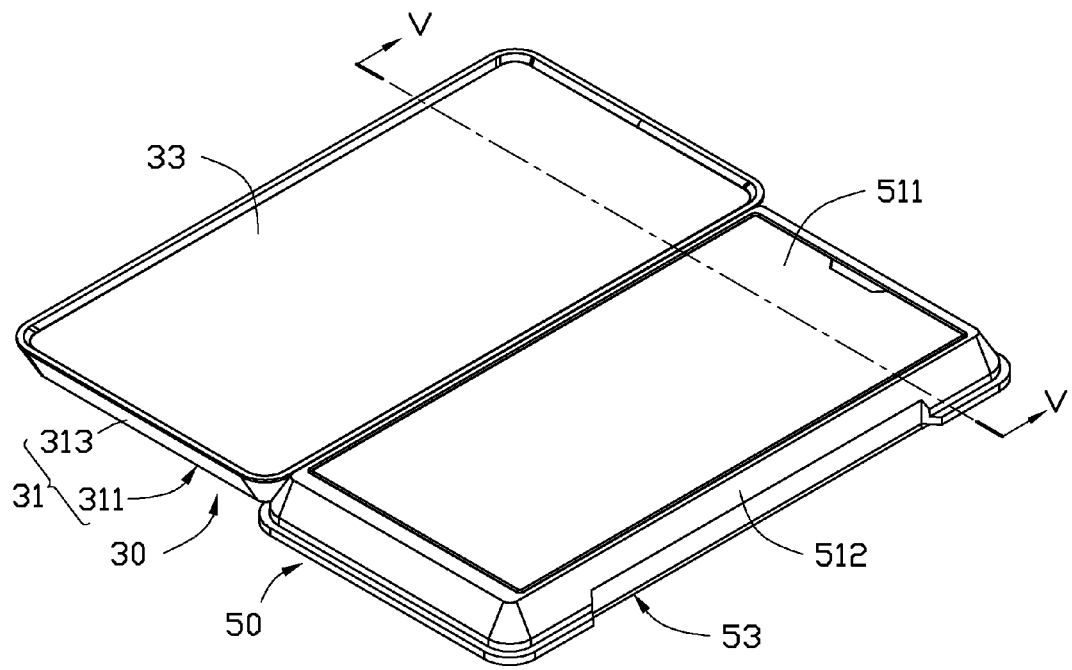
FIG. 4 is a schematic view of the first base member and the second base member connected by the connection structure shown in FIG. 1.
Figure 5:
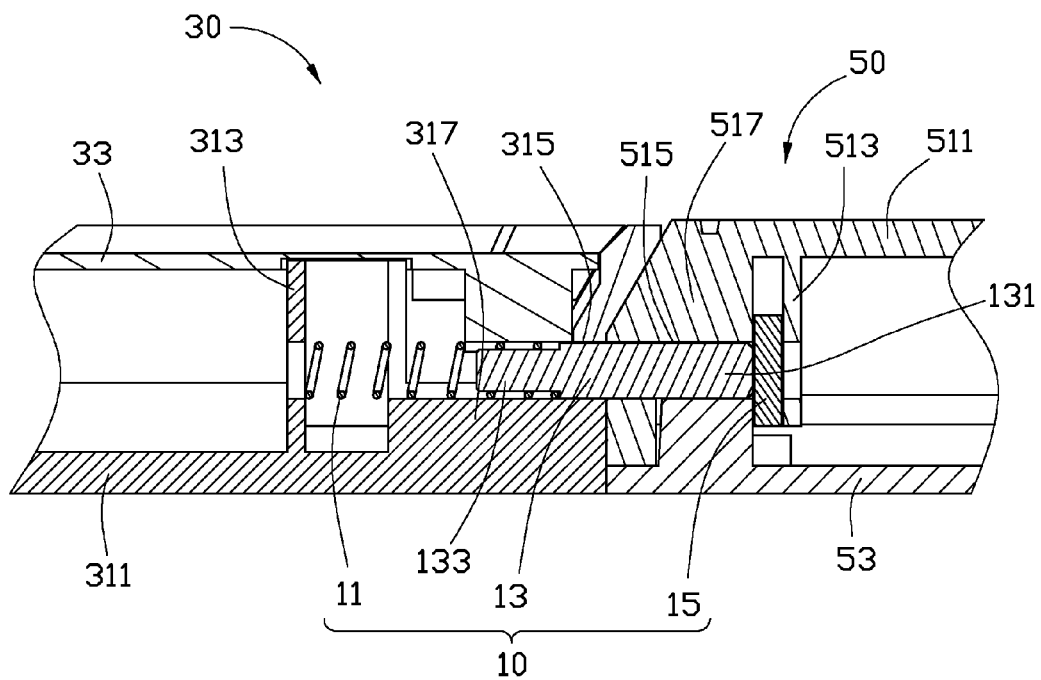
FIG. 5 is a partially cross-sectional view taken along line V-V shown in FIG. 4.

FIGS. 1, 4 and 5 show an exemplary embodiment of an electronic device 100, which may be a PDA, or a mobile phone. The electronic device 100 includes two connection structures 10 (FIG. 5), a first base member 30, and a second base member 50. The first base member 30 and the second base member 50 are detachable and assembled overlapping each other by a hook and locking structure. The first base member 30 and the second base member 50 can also be detachably assembled side by side by the connection structures 10.

Figure 2:
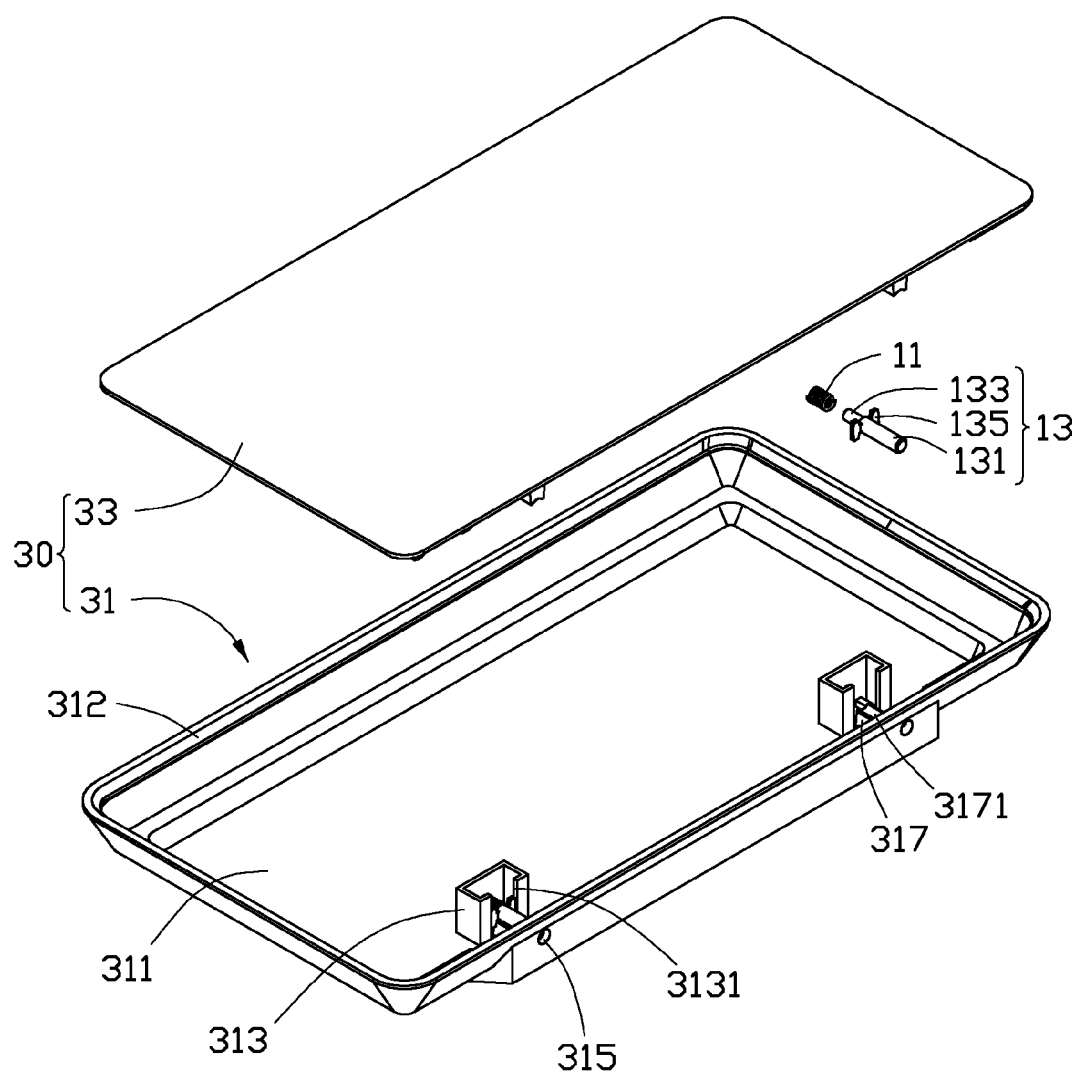
FIG. 2 is an exploded view of the first base member of the electronic device shown in FIG. 1.
Figure 3:
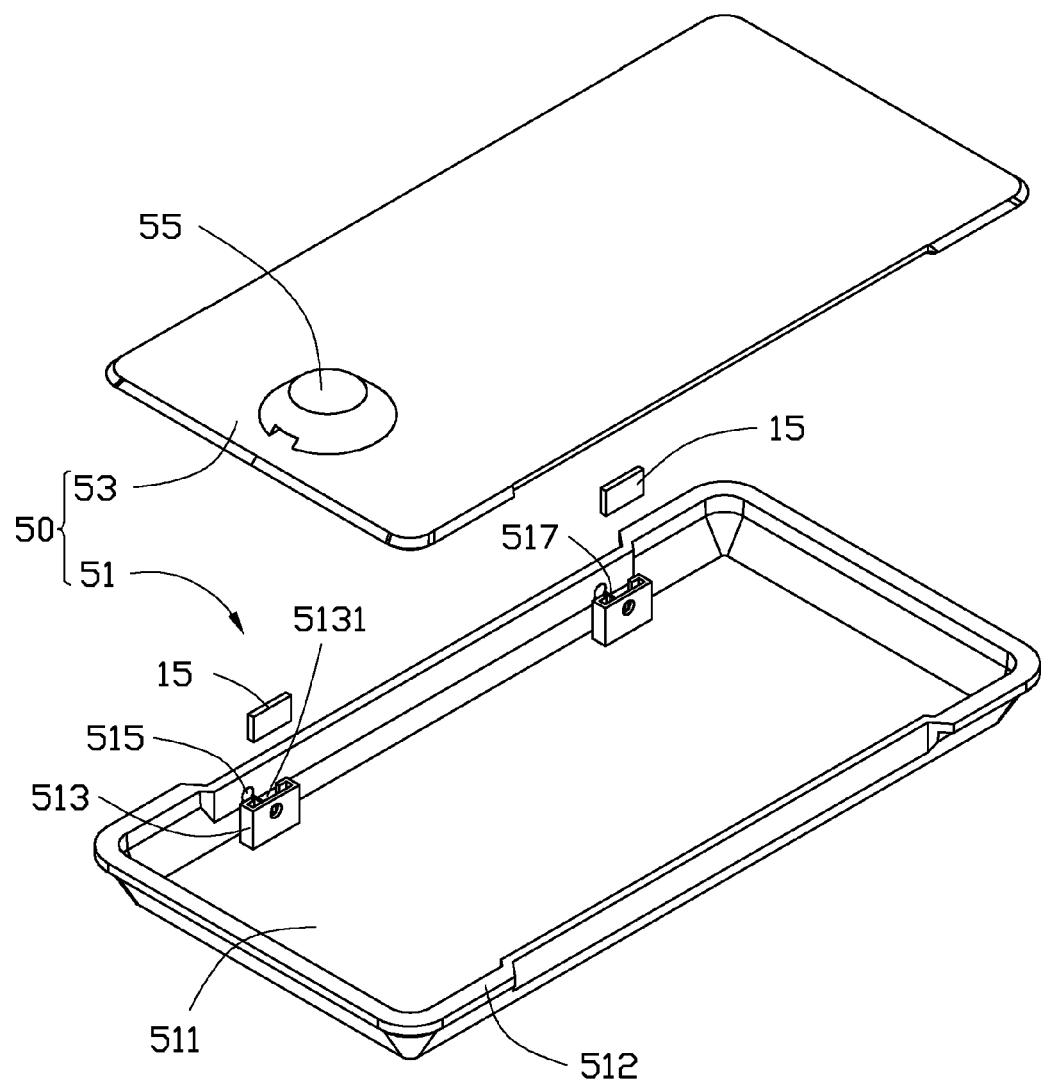
FIG. 3 is an exploded view of the second base member of the electronic device shown in FIG. 1.

Referring to FIGS. 2 and 3, each connection structure 10 includes an elastic piece 11, an assembling latch 13, and a magnetic piece 15. In this exemplary embodiment, the elastic piece 11 can be a coil spring. One end of the elastic piece 11 is detachably fixed to the first base member 30, and the other end is detachably fixed to the assembling latch 13. Thus, the assembling latch 13 is detachably assembled to the first base member 30 through the elastic piece 11, and the elastic piece 11 provides an elastic contraction force for the assembling latch 13.

In detail, the assembling latch 13 is detachably assembled to the first base member 13 and does reciprocating movement relative to the first base member 30. When the assembling latch 13 partially moves out the first base member 30 under external force, the elastic piece 11 is deformed forced by the assembling latch 13. When the external force is eliminated, the elastic piece 11 recovers original state and the assembling latch 13 is received in the first base member 30.

The assembling latch 13 is made of metal material, such as iron, and includes a main body 131, a fixing body 133, and two blocking portions 135. The main body 131 and the fixing body 133 are substantially coaxial cylinders, and the fixing body 133 is connected to one end of the main body 131. The diameter of the main body 131 is larger than that of the fixing body 133; the size of the fixing body 133 corresponds to the elastic piece 11, so the fixing body 133 is detachably received in the elastic piece 11. The two blocking portions 135 are substantially flat plates and are substantially perpendicularly positioned on the main body 131. The blocking portions 135 are capable of securing the assembling latch 13, preventing the assembling latch 13 from moving out of the first base member 30.

The magnetic piece 15 can be a magnet, and is detachably assembled to the second base member 50, and is capable of providing magnetic force on the assembling latch 13. The magnetic force between the magnetic piece 15 and the assembling latch 13 is larger than the contraction force of the elastic piece 11 located at the assembling latch 13, so when the assembling latch 13 partially moves out the first base member 30 forced by the magnetic force of the magnetic piece 15, the assembling latch 13 then is accordingly and partially received in the second base member 50. Thus, the first base member 30 and the second base member 50 are connected and assembled together by the assembling latches 13 of the connection structures 10.

Moreover, to securely and stably connect the first base member 30 and the second base member 50, the electronic device 100 can further include a plurality of connection structures 10 which are assembled to one side of the first base member 30 and the second base member 50. Additionally, the number of the connection structure 10 can be one. In the exemplary embodiment, the two connection structures 10 are detachably assembled to opposite ends of the first base member 30, respectively.

Referring to FIG. 2, the first base member 30 includes a first housing 31 and a first cover 33 covering on the first housing 31. The first housing 31 is capable of receiving a motherboard and other components of the electronic device 100. The first housing 31 includes a bottom wall 311, a peripheral wall 312 around the bottom wall 311, and two fixed portions 313 located at the bottom wall 311. The first housing 31 defines two through holes 315 located at the peripheral wall 312.

The two fixed portions 313 are respectively aligned with the through holes 315, and are capable of securing and fixing the elastic pieces 11 and the assembling latches 13, making the assembling latches 13 align with the through holes 315. In this exemplary embodiment, the size of the main body 131 substantially matches the through hole 315, so the main body 131 moves out the first base member 30 through the through hole 315, until the blocking portions 135 resist against the peripheral wall 312. Each fixed portion 313 is substantially hollow frame and defines an opening 3131, and the opening 3131 is aligned with the corresponding through hole 315. One end of the elastic piece 11 is fixed to the fixed portion 313, and the other end is fixed to the fixing body 133. Thus, the elastic piece 11 and the assembling latch 13 pass through the opening 3131 and are received in the fixed portion 313.

Additionally, the first base member 30 further includes two supporting blocks 317 respectively located between the fixed portions 313 and the peripheral wall 312. Each supporting block 317 defines a guiding slot 3171 aligned with the opening 3131 and the through hole 315, so the assembling latch 13 moves along the guiding slot 3171 and passes through the opening 3131 and the through hole 315. The first cover 33 is mounted on the first housing 31 to cover and secure the motherboard and other component, and support a keyboard module (not shown).

Referring to FIG. 3, the size and the shape of the second base member 50 corresponds to the size and the shape of the first base member 30. The second base member 50 includes a second housing 51 and a second cover 53 covering the second housing 51. In this exemplary embodiment, the second housing 51 is capable of securing and receiving a display module, a touch screen, and other components. The second housing 51 includes a display screen 511, a frame 512 around the display screen 511, and two locking portions 513 located on the display screen 511.

The frame 512 defines two connection holes 515 aligned with the through holes 315 of the first housing 31 to receive the assembling latches 13. The two locking portions 513 are respectively aligned with the fixed portions 313 and are substantially hollow frames, which have the substantially same shape as the fixed portions 313. The locking portions 513 are capable of securing and receiving the magnetic pieces 15. Each locking portion 513 defines an opening 5131 aligned with the corresponding connection hole 515 and the through hole 315. Thus, the assembling latches 13 pass through the through holes 315, the connection holes 515 and the openings 5131, and then are received in the locking portions 513 and attracted by the magnetic pieces 15.

Additionally, in this exemplary embodiment, the second base member 50 further includes two guiding blocks 517 respectively located between the locking portions 513 and the frame 512. Each guiding block 517 defines a sliding slot (not shown) aligned with the connection hole 515 and the opening 5131, so the assembling latches 13 from the first base member 30 pass through the connection holes 515 and move along the sliding slots towards the openings 5131. The second cover 53 is mounted on the second housing 51 to cover and secure the display module, the touch screen and other components, and support a camera 55.

In use, further referring to FIG. 1, when the first base member 30 and the second base member 50 are detachable and assembled overlapping each other by a hook and locking structure, the electronic device 100 is in a first operation mode. The first base member 30 is electrically connected to the second base member 50, and the display screen 511 is used as human machine interface to input and output information.

When the first base member 30 and the second base member 50 are separated independently for a predetermined distance, which is defined as a second operation mode of the electronic device 100, the first base member 30 communicates with the second base member 50 through wireless communication, such as Bluetooth, or Wi-Fi. For example, a wireless receiver is located in the first base member 30, and a corresponding wireless transmitter is located in the second base member 50. Thus, the first base member 30 can communicate with the second base member 50 in a predetermined distance.

Further referring to FIGS. 2-5, the first base member 30 and the second base member 50 are detachably assembled side by side by the connection structures 10, which is defined as a third operation mode of the electronic device 100. In detail, the through holes 315 are aligned with the connection holes 515 of the second base member 50. Since the magnetic force between the magnetic pieces 15 and the assembling latches 13 is larger than the contraction force of the elastic pieces 11 located on the assembling latches 13. Therefore, the assembling latches 13 move out of the through holes 315, and pass through the connection holes 515, and are attracted on the magnetic pieces 15. Thus, the first base member 30 and the second base member 50 are quickly assembled.

To detach the first base member 30 and the second base member 50, the first base member 30 and the second base member 50 are moved in opposite directions. This causes the assembling latches 13 to partially move out the first housing 31 until the assembling latches 13 are freed from the magnetic force, and the assembling latches 13 are pulled back to the first base member 30 under the action of the contraction force of the elastic pieces 11. Thus, the first base member 30 and the second member 50 are detached.

In summary, in the electronic device 100 of the exemplary embodiment, the first base member 30 and the second base member 50 can be quickly assembled together by the connection structures 10 under the action of magnetic force. Thus, the electronic device 100 is easy to detach and operate, which may save assembly time.

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in matters of shape, size, and arrangement of parts within the principles of exemplary disclosure to the full extent indicated by the broad general meaning of the terms in which the appended claims are expressed.

What is claimed is:

1. An electronic device, comprising:
   a first base member comprising a first housing, the first housing comprising a bottom wall, a peripheral wall around the bottom wall, two fixed portions, and two supporting blocks respectively located between the fixed portions and the peripheral wall, the first housing defining two through holes located at the peripheral wall and respectively aligned with the two fixed portions, each supporting block defining a guiding slot aligned with the through hole;
   a second base member detachably connected to the first base member; and
   a connection structure comprising:
   an assembling latch located in the first base member and moving along the guiding slot and passing though the through hole moving relative to the first base member; and
   a magnetic piece located in the second base member and providing a driving force, wherein the assembling latch is attracted by the driving force of the magnetic piece to partially move out the first base member, the assembling latch is partially received in the second base member to connect and assemble the first base member and the second base member side by side;
   when the driving force of the magnetic piece is removed, the assembling latch moves back to and is received in the first base member, and the first base member and the second base member are detached; and wherein the assembling latch further comprises two blocking portions positioned on the main body, the blocking portions are capable of resisting against the first base member and securing the assembling latch to prevent the assembling latch from moving out of the first base member.

2. The electronic device as claimed in claim 1, wherein the connection structure further comprises an elastic piece, one end of the elastic piece is detachably fixed to the first base member, and the other end of the elastic piece is detachably fixed to the assembling latch, and the elastic piece provides elastic contraction force for the assembling latch.

3. The electronic device as claimed in claim 2, wherein when the assembling latch partially moves out the first base member attracted by the magnetic piece, the elastic piece deforms, when the driving force of the magnetic piece is eliminated, the assembling latch is received in the first base member.

4. The electronic device as claimed in claim 2, wherein the assembling latch comprises a main body and a fixing body, the fixing body is connected to one end of the main body, the elastic piece is fixed on the fixing body, the diameter of the main body is larger than the fixing body, and the size of the fixing body corresponds to the elastic piece, the fixing body is detachably received in the elastic piece.

5. The electronic device as claimed in claim 4, wherein the first base member further comprises a first cover covering on the first housing, the two fixed portions are located at the bottom wall and are adjacent to the peripheral wall.

6. The electronic device as claimed in claim 4, wherein the fixing body is integrally formed on the main body, and the fixing body and the main body are substantially coaxial cylinders.

7. The electronic device as claimed in claim 5, wherein the fixed portions are capable of securing and fixing the elastic pieces and the assembling latches to make the assembling latches to align the through holes, the main body moves out the first base member through the through hole until the assembling latches are freed from the magnetic force, and the assembling latches are pulled back to the first base member under the action of the contraction force of the elastic pieces.

8. The electronic device as claimed in claim 7, wherein the second base member comprises a second housing and a second cover covering the second housing, the second housing comprises a display screen and a frame around the display screen, and the frame defines two connection holes aligned with the through holes of the first housing to receive the assembling latches.

9. The electronic device as claimed in claim 8, wherein the second base member further comprises two locking portions located on the display screen and respectively aligned with the fixed portions, the locking portions are capable of securing and receiving the magnetic pieces, each locking portion defines an opening aligned with the corresponding connection hole and the through hole, the assembling latches pass through the through holes, the connection holes and the openings, and then are received in the locking portions and attracted by the magnetic pieces.

10. The electronic device as claimed in claim 9, wherein the second base member further comprises two guiding blocks respectively located between the locking portions and the frame, the guiding block are aligned with the connection hole and the opening, the assembling latches from the first base member pass through the connection holes and move along guiding blocks towards the openings.

11. The electronic device as claimed in claim 1, further comprising a plurality of connection structures assembled to one side of the first base member and the second base member to secure and stabilify the connection of the first base member and the second base member.

* * * * *